(12) United States Patent
Shen (10) Patent No.: US 11,290,045 B2
(45) Date of Patent: Mar. 29, 2022

(54) DEVICES, SYSTEMS, AND METHODS FOR SELF-HEATING BATTERIES

(71) Applicant: NIO USA, Inc., San Jose, CA (US)

(72) Inventor: Miaosen Shen, Fremont, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 16/866,632

(22) Filed: May 5, 2020

(65) Prior Publication Data

US 2021/0351732 A1 Nov. 11, 2021

(51) Int. Cl.
| | |
|---|---|
| *H02P 21/16* | (2016.01) |
| *H02P 21/22* | (2016.01) |
| *H02P 27/12* | (2006.01) |
| *B60K 6/22* | (2007.10) |
| *B60L 58/27* | (2019.01) |
| *B60K 1/00* | (2006.01) |

(52) U.S. Cl.
CPC ............. *H02P 21/16* (2016.02); *B60K 1/00* (2013.01); *B60K 6/22* (2013.01); *B60L 58/27* (2019.02); *H02P 21/22* (2016.02); *H02P 27/12* (2013.01); *B60Y 2200/91* (2013.01); *B60Y 2200/92* (2013.01)

(58) Field of Classification Search
CPC ......... H02M 2001/007; H02M 7/4807; H02M 2001/0087; H02M 2001/009; H02M 7/00; H02M 7/527; H02P 1/00; H02P 1/04; H02P 1/026; H02P 1/18; H02P 1/16; H02P 1/24; H02P 1/26; H02P 1/265; H02P 1/42; H02P 1/423; H02P 1/46; H02P 1/465; H02P 5/00; H02P 6/00; H02P 21/00; H02P 21/22; H02P 21/0003; H02P 21/08; H02P 21/34; H02P 7/29; H02P 23/00; H02P 7/00; H02P 27/04; H02P 27/06; H02P 27/085; H02P 27/00; H02P 21/30; H02P 29/60; H02P 29/64; H02P 29/66; H02P 29/68; H02P 2203/01; H02P 2203/03; H02P 2203/05; H02P 6/04; H02P 27/08; H02P 25/026; H02P 25/022; H02P 25/062; H02P 6/16

See application file for complete search history.

(56) References Cited

U.S. PATENT DOCUMENTS

| | | | |
|---|---|---|---|
| 5,834,131 A | 11/1998 | Lutz et al. | |
| 6,072,301 A | 6/2000 | Ashtiani et al. | |
| 6,882,061 B1 | 4/2005 | Ashtiani et al. | |
| 8,536,809 B2* | 9/2013 | Kojima | ............ B60L 15/025 318/139 |
| 8,970,147 B2* | 3/2015 | Baglino | ............ B60L 58/25 318/400.09 |
| 2020/0391611 A1* | 12/2020 | Nobumoto | ............ B60L 7/18 |

* cited by examiner

*Primary Examiner* — Antony M Paul
(74) *Attorney, Agent, or Firm* — Sheridan Ross P.C.

(57) ABSTRACT

At least one embodiment is directed to a system including a motor, a battery that provides power to the motor, and control circuitry that provides one or more first current pulses to the motor using power from the battery to cause one or more second current pulses in the battery that heat the battery to a desired temperature while maintaining zero torque in the motor.

18 Claims, 9 Drawing Sheets

DEVICES, SYSTEMS, AND METHODS FOR SELF-HEATING BATTERIES

FIELD

The present disclosure is generally directed to devices, systems, and methods for self-heating batteries, for example, within a vehicle.

BACKGROUND

Most vehicles, in particular electric and hybrid vehicles, include batteries within the vehicles that power components and/or motors of the vehicle. Whether in a vehicle or other device, batteries can be negatively affected by cold environments. For example, on an electric vehicle, cold weather may negatively impact charging for a battery of the electric vehicle. Thus, it may be desired to have the battery at a minimum temperature before attempting to charge the battery.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

Example embodiments control the inverter/motor drive unit of a vehicle or other device to generate a series of ac pulse currents in the battery pack to self-heat the pack due to the internal resistance. Li-Ion batteries experience difficulty being charged at very low temperatures. Under those conditions, the battery should be heated up to certain temperature before the battery can be charged or be used to power load.

At least one example embodiment proposes a control of the drive unit to generate a series of ac pulse currents to the battery pack to generate heat inside of the cells due to internal resistance. The control also maintains zero torque (or alternatively, substantially zero torque) in the motor so that the vehicle remains stationary and causes no harm to the gearbox.

There are many key benefits of this technology, including power efficiency since high pulse currents will be generated in the battery, which directly heats up the battery cells. In addition, no torque will be generated in the motor, thus the vehicle can achieve the heating while stationary. Furthermore, the shape and duration of the pulse current can be controlled such that no lithium plating will occur, so no damage to the battery will occur.

As discussed in more detail below, with a permanent magnet motor drive with a position sensor, the three-phase stator current can be converted into 2 phase d-q value with the Park transformation. With this transformation, the d-axis aligns with flux generated by the magnets of the motor. When the inverter injects current in the d-axis only, the generated flux is enhanced or reduced by the magnets and does not generate torque on the rotor. When the inverter injects q-axis current in the stator, the motor will generate torque. At least one example embodiment proposes a method to generate high ac pulse currents in the battery to inject a large pulse of current in the d-axis very quickly and then bring the current back to zero while maintaining the current in q-axis at zero, and then repeat that in sequence until the battery is sufficiently heated. Here, the inverter energizes and de-energizes the d-axis inductor very quickly, which in turn draws large positive pulse current from the battery and then a negative pulse. The amplitude of the battery current pulse is controlled by the rate of the current increase/decrease in the d-axis motor current and the peak current of the d-axis current. These variables can be controlled and regulated.

A first control method uses direct current regulation on the d-axis and two loop control for q-axis current with a speed outer loop and a current inner loop. The d-axis current reference is predetermined, and the motor speed regulated to zero, which should result in zero q-axis current reference. During the period when the current should be zero, the inverter can either maintain controlling the current to be zero of simply turn all switches off.

A second control method directly uses zero current as a reference for the q-axis current. During the period when the current should be zero, the inverter can either maintain controlling the current to be zero of simply turn all switches off.

In both method above, high speed current regulation is used. Another way is to use open loop control to impose a d-axis voltage on the motor first with a positive pulse to increase the current and then a negative pulse to bring the current back to zero. The q-axis voltage should remain zero (or grounded) in the whole period. During the period when the current should be zero, the inverter should simply turn all switches off to make sure all current goes back to zero. The inverter could however, also maintain switching at zero voltage.

For all the control methods above, a lower frequency is generated to repeat the pulse, and this frequency can be a fixed frequency, and could also be dithering around given frequency to achieve the desired current level in the battery while reducing the acoustic noise at any particular frequency. Also, different frequency changing methods can be used, such as random frequency generation centered around a given frequency and the like.

Inventive concepts apply to permanent motor drive, but may also apply to an induction motor. The same or similar methods can be used for polyphase motors with more than 3-phases.

Figure 1:
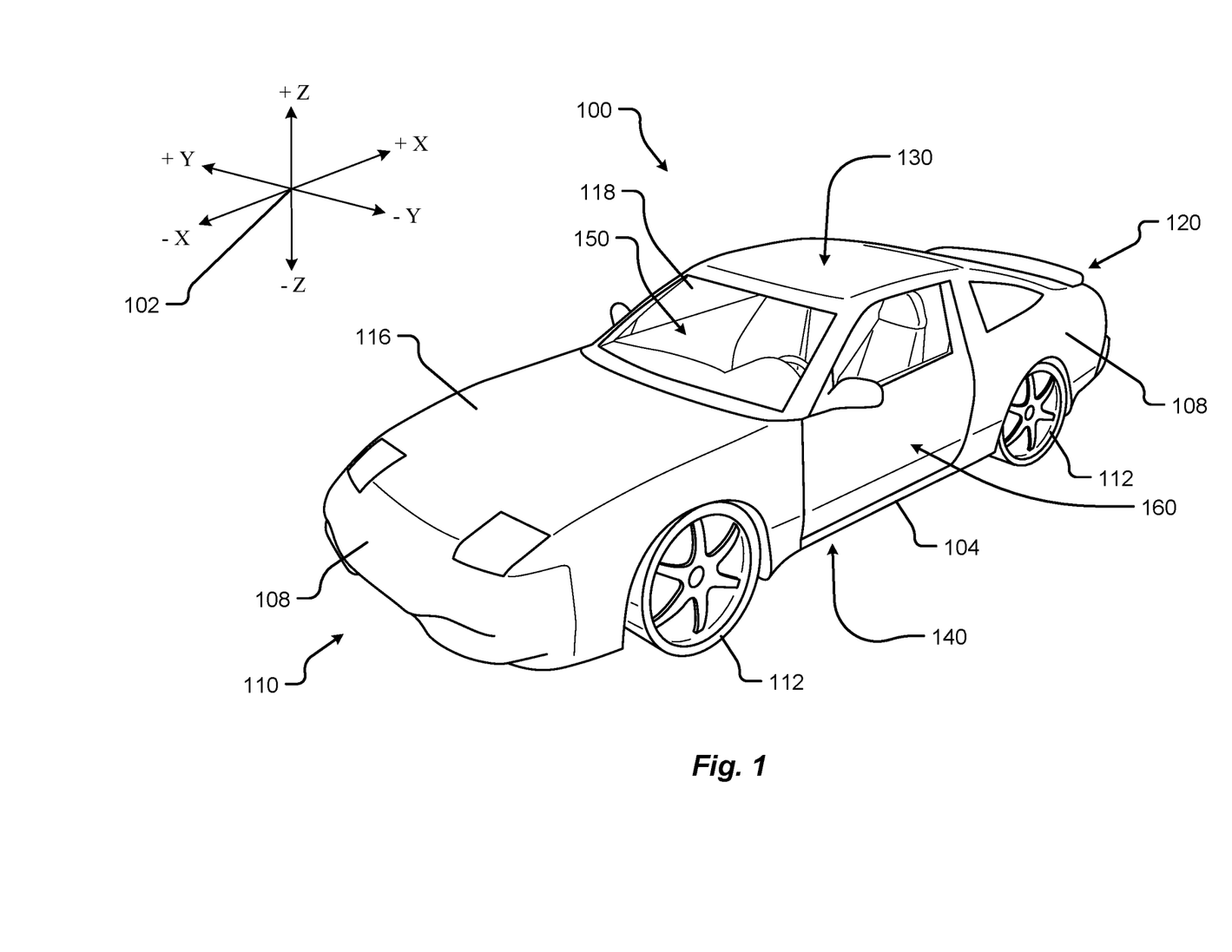
FIG. 1 shows a perspective view of a vehicle (or electric vehicle) in accordance with at least one example embodiment.

FIG. 1 shows a perspective view of a vehicle (or electric vehicle) 100 in accordance with example embodiments. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the −X direction relative to the other object or component. Conversely, an object is rearward of another object or component if the object is located in the +X direction relative to the other object or component.

The vehicle 100 may be, by way of example only, a battery electric vehicle (BEV) or a hybrid electric vehicle (HEV). Where the vehicle 100 is BEV, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is an HEV, the vehicle 100 may comprise the above described elements of a BEV with the addition of a gas-powered (or diesel-powered) engine and associated components in the front compartment (under the vehicle hood 116), which engine may be configured to drive either or both of the front wheels 112 or the rear wheels 112. In some embodiments where the vehicle 100 is an HEV, the gas-powered engine and associated components may be located in a rear compartment of the vehicle 100, leaving the front compartment available for storage or trunk space or for other uses. In some embodiments, the vehicle 100 may be, in addition to a BEV and an HEV, a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

The vehicle 100 may be capable of autonomous operation, where one or more processors receive information from various sensors around the vehicle and use that information to control the speed and direction of the vehicle 100 so as to avoid hitting obstacles and to navigate safely from an origin to a destination. In such embodiments, a steering wheel is unnecessary, as the one or more processors, rather than a vehicle occupant, control the steering of the vehicle 100.

Figure 2:
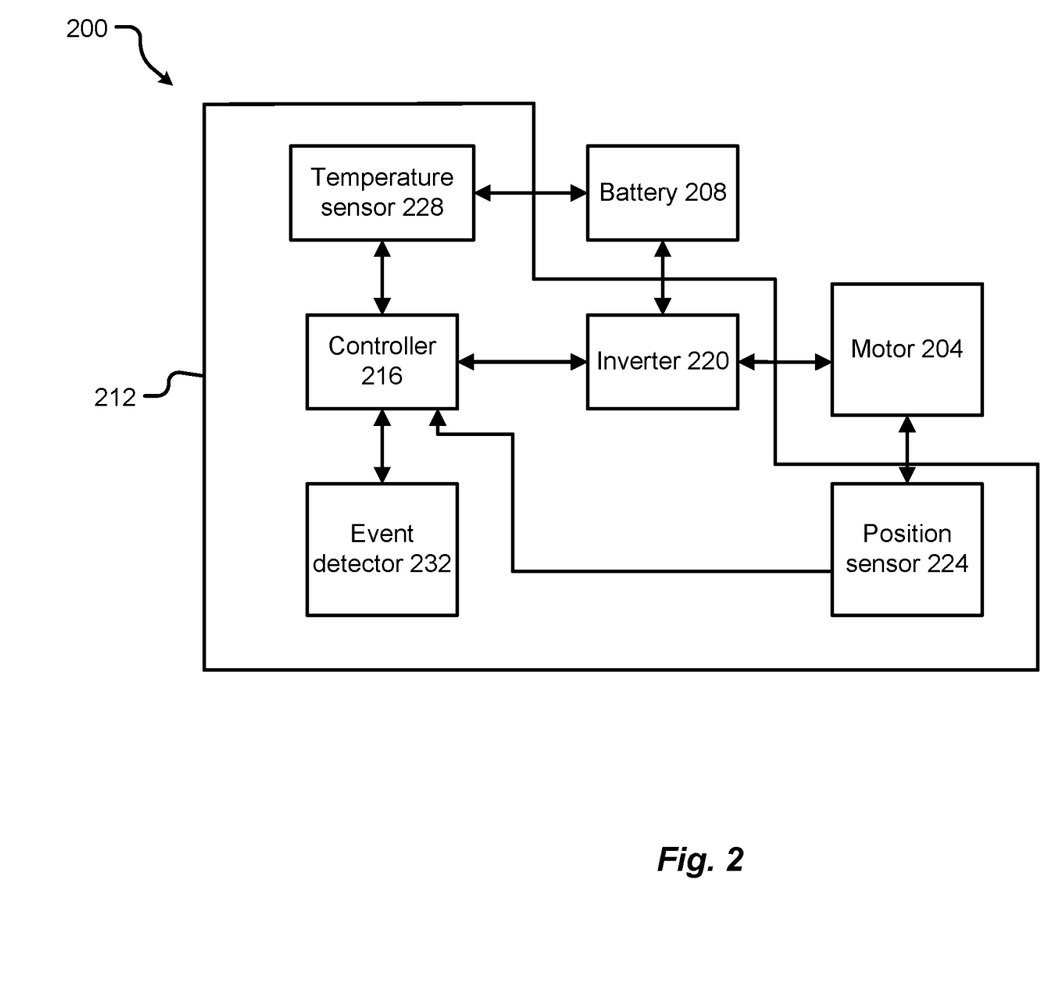
FIG. 2 is an example schematic of a system of the vehicle in accordance with at least one example embodiment.

FIG. 2 is an example schematic of a system 200 of the vehicle 100 in accordance with at least one example embodiment. The system 200 includes a motor 204 of the vehicle (e.g., an alternating current (AC) motor), a battery 208 that provides power to the motor 204, and control circuitry 212 to control the motor 204 using power from the battery 208. The battery 208 may be a direct current (DC) battery for powering the motor 204 and other components of the vehicle 100. The battery 208 may be a 400V battery including a plurality of battery cells. Although only one motor 204 and one battery 208 are shown, more motors 204 and batteries 208 may be included if desired.

The control circuitry 212 includes a controller 216 that provides one or more first current pulses to the motor 204 using power from the battery 208 to cause one or more second current pulses in the battery 208 that heat the battery 208 to a desired temperature while maintaining zero torque (or alternatively, substantially zero torque) in the motor 204. As shown, the control circuitry 212 includes an inverter 220 coupled between the battery 208 and the motor 204. The inverter 220 may be controlled to drive the different phases of the motor 204. Said another way, the controller 216 applies control signals to the inverter 220 to cause the inverter 220 to provide the one or more first current pulses to the motor 204. Generation of the control signals is discussed in more detail below with reference to FIGS. 3-8.

The control circuitry 212 may further include a position sensor 224 that senses a position of a rotor of the motor 204. The position of the rotor may be used by the controller 216 to provide the one or more first current pulses to the motor 204, as described in more detail below.

The control circuitry 212 may include a temperature sensor 228 that senses temperature of the battery 208. In accordance with at least one example embodiment, the control circuitry 212 determines to provide the one or more first current pulses to the motor 204 when the sensed temperature of the battery 208 is below a threshold temperature. In at least one example embodiment, the sensed temperature may be determined as an average temperature of a plurality of battery cells of the battery 208 (e.g., all cells or selected cells). In this case, the temperature sensor 228 may include a plurality of temperature probes sensing temperatures at or near the plurality of battery cells. A probe may be included for each cell of the battery 208 or for selected cells of the battery 208, as desired. In at least one example embodiment, the sensed temperature may be determined as a temperature of a single cell in the battery 208, where the single cell is at a desired location within the plurality of battery cells (e.g., in a central location). In this case, the temperature sensor 228 may include a single temperature probe located at or near the single cell. In the event that the battery 208 includes a plurality of battery modules with each module containing battery cells, the sensed temperature may be an average temperature of all or some of the battery modules or a temperature of a selected battery module as desired. Any known type of sensor and/or probe may be used to sense the temperature. The threshold temperature may be a design parameter set based on empirical evidence and/or preference. For example, the threshold temperature may vary depending on the method used to sense temperature and/or the purpose for which the battery 208 is about to be used or is being used. The temperature threshold of the battery 208 may be different for charging the battery 208 than for an operation that intends to discharge the battery 208. Additionally or alternatively, the threshold temperature may vary according to battery chemistry. For example, Li-ion batteries experience difficulty charging at temperatures below −10° C.

The control circuitry 212 may include an event detector 232 to detect an event that triggers the system 200 to begin heating and/or end heating the battery 208. Thus, it may be said that the control circuitry 212 provides the one or more first current pulses to the motor 204 when the sensed temperature of the battery 208 is below the threshold temperature and in response to a trigger detected by the event detector 232. In at least one example embodiment, the event detector 232 detects events that would be best carried out with the temperature of the battery 208 being above the temperature threshold. For example, the event detector 232 may detect a charging event indicating that the battery 208 is about to be charged by an external source. In this case, the event may be the connection of the external source to a charging terminal of the vehicle 100, an instruction from a user to begin charging, an instruction from another component of the vehicle 100 internal or external (e.g., a mobile phone) to the vehicle 100, and/or the like. In another example, the event detector 232 may detect a discharge event indicating that the battery 208 is about to be discharged to provide power to the motor 204 and/or other elements of the vehicle 100. The discharge event may include a driver approaching the vehicle 100, which is a normal indication that the driver is about to enter and attempt to start the vehicle 100. The discharge event may include other events, such as the opening of a door of the vehicle 100, an instruction from a user, an instruction from another component of the vehicle 100 internal or external (e.g., a mobile phone) of the vehicle 100, and/or the like. In view of the above, it should be appreciated that the event detector 232 may include one or more sensors for sensing the events external and/or internal to the vehicle 100 (e.g., cameras, electrical sensors, mechanical sensors, electromechanical sensors, etc.).

Figure 3:
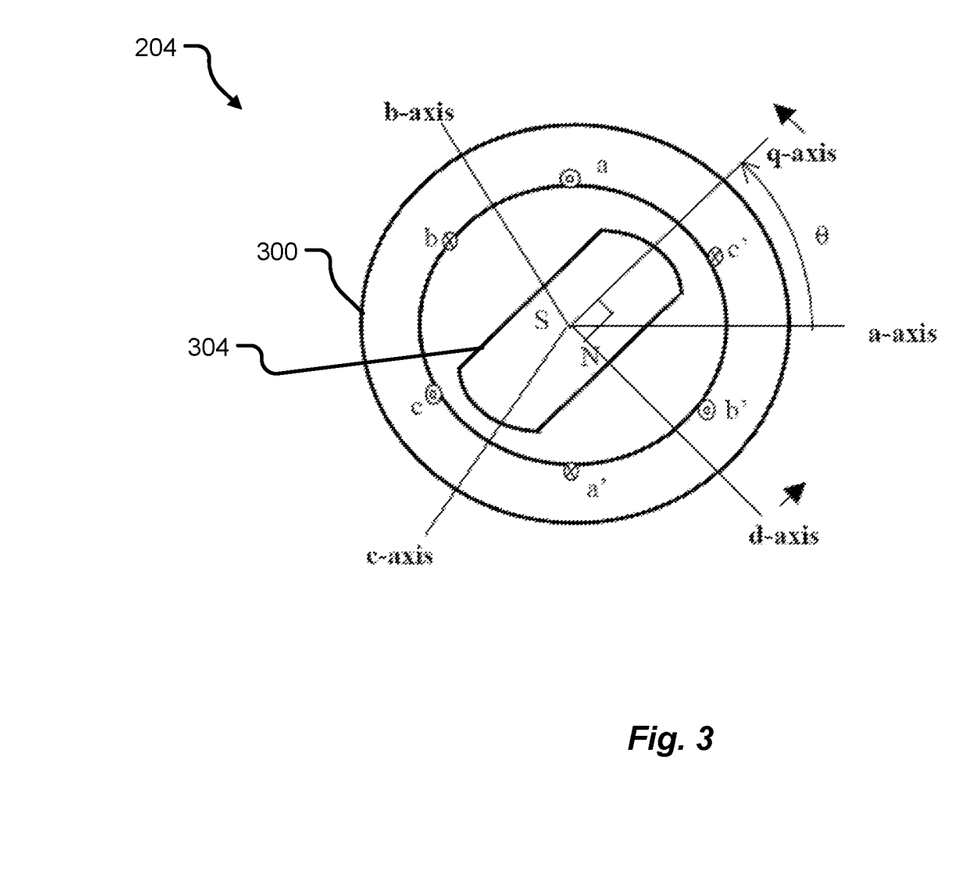
FIG. 3 is an example schematic of a motor in accordance with at least one example embodiment.
Figure 4:
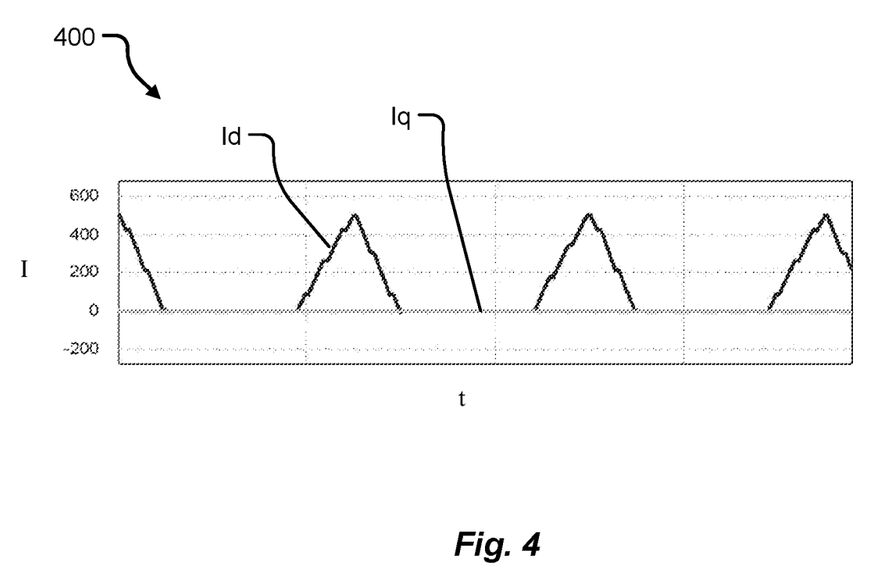
FIG. 4 is a graph illustrating example d-axis and q-axis motor currents in accordance with at least one example embodiment.

FIG. 3 is an example schematic of a motor 204 in accordance with at least one example embodiment, and FIG. 4 is a graph 400 illustrating example d-axis and q-axis motor currents Id and Iq in accordance with at least one example embodiment that cause self-heating of the battery 208.

As shown in FIG. 3, the motor 204 may be a permanent magnet motor with a stator 300 and a rotor 304. The motor 204 may have three phases a, b, and c, with each phase having an associated stator axis currents for the a-axis, b-axis, and c-axis. As is known in the art, the a, b, and c stator axis currents can be converted into two phase rotor axis currents using the Park transformation to obtain a d-axis current and a q-axis current. The a, b, c, d, and q axes and the a, b, and c coil windings are shown in FIG. 3.

Injecting current into the q-axis will generate torque in the motor 204 and cause the rotor 304 to turn. However, injecting current into only the d-axis (and not the q-axis) does not generate torque in the motor 204 and the rotor 304 remains stationary. Inventive concepts propose to take advantage of this characteristic to heat the battery 208 by injecting current into the d-axis while maintaining the q-axis current at zero to achieve the d-axis and q-axis currents shown in FIG. 4. As shown in FIG. 4, the d-axis current Id has triangular pulses while the q-axis current Iq is maintained at zero. Injecting d-axis current pulses as shown in FIG. 4 will cause corresponding current pulses in the battery 208 that cause the battery 208 to self-heat to the desired temperature (e.g., before a charging operation of the battery 208).

Figure 5A:
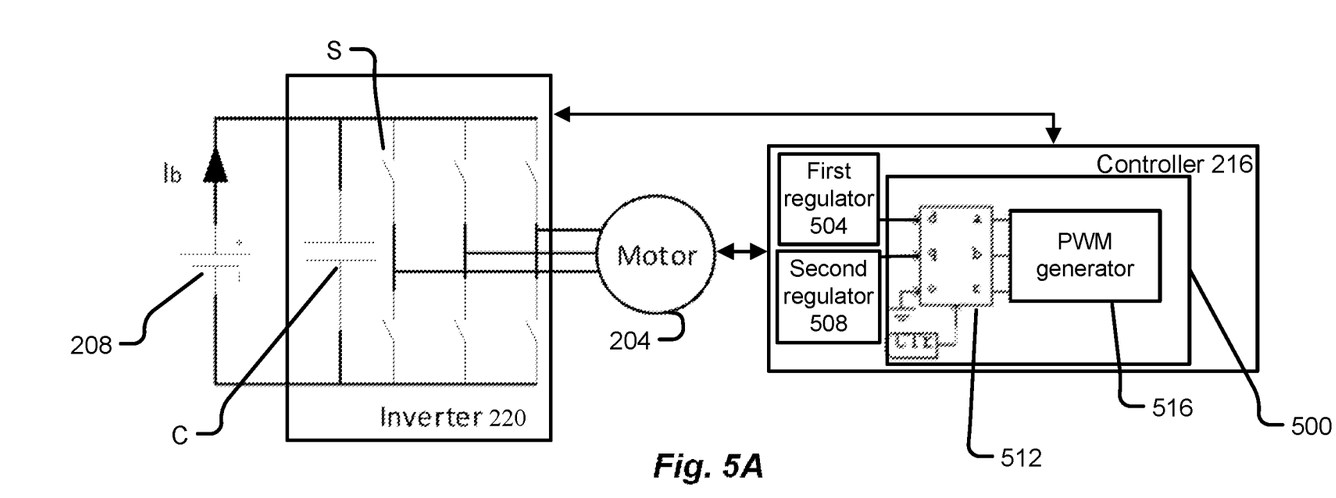
FIG. 5A is an example schematic of details of the system of FIG. 2 in accordance with at least one example embodiment.

FIG. 5A is an example schematic of details of the system 200 of FIG. 2 in accordance with at least one example embodiment. As shown in FIG. 5A, the inverter 220 is coupled to the motor 204, the battery 208, and the controller 216.

The inverter 220 includes a plurality of switches S (only one switch S labeled) and a capacitance C. The switches S are controlled by control signals from controller 216 to convert DC power from the battery 208 into signals that drive the AC motor 204. The pulse generator 500 provides the control signals to the inverter 220 for each phase of the motor 204 (e.g., phases a, b, c of the motor 204 shown in FIG. 4) according to output of the controller 216.

The controller 216 includes a pulse generator 500, a first regulator circuit (or first regulator) 504, and a second regulator circuit (or second regulator) 508. The pulse generator 500 may include a converter 512 and a pulse width modulation (PWM) signal generator (or PWM generator) 516 for providing the control signals to the inverter 220. The pulse generator 500 generates each control signal based on a first signal for a d-axis of the motor 204 and a second signal for a q-axis of the motor 204. The first regulator circuit 504 generates the first signal as a first input d to the converter 512, and the second regulator circuit 508 generates the second signal as a second input q to the converter 512. Accordingly, it should be understood that the first regulator 504 regulates a d-axis current for the motor 204 for self-heating of the battery 208 while the second regulator 508 regulates a q-axis current for the motor 204 for self-heating of the battery 208. As also shown, the converter 512 further includes a zero sequence terminal o with zero command and an input for a signal CTr, which is the rotor position angle from the rotor position sensor 224. Example embodiments relating to the first and second regulator circuits 504/508 are described in more detail below with reference to FIGS. 7-9.

The converter 512 may include any hardware and/or software for converting d-axis input signals and q-axis input signals to signals for phases a, b, c of the motor 204. The converter 512 may include a processor executing instructions stored on a memory or computer readable medium, an application specific integrated circuit (ASIC), a field programmable gate array (FPGA), logic gates, and/or the like. The converter 512 outputs a signal for each phase a, b, and c of the motor 204 to the PWM generator 516.

The PWM generator 516 includes any hardware and/or software for generating the control signals provided to the switches S of the inverter 220. As is known in the art, pulse width modulation is used for driving inverters to convert DC signals into AC signals. A pulse width of each control signal output from the PWM generator 516 may determine a frequency of the AC signal that drives the motor 204. Thus, the pulse generator 516 may adjust pulse widths of the control signals based on a frequency desired for operating the motor 204 and may adjust amplitudes of the control signals based on the signals received from the converter 512.

Here, it should be appreciated that the pulse generator 500 may include additional hardware and/or software for carrying out other functions of the vehicle 100 not necessarily mentioned herein but known to be part of the functionality controlling the motor 204 and other elements of FIGS. 1 and 2.

Figure 6:
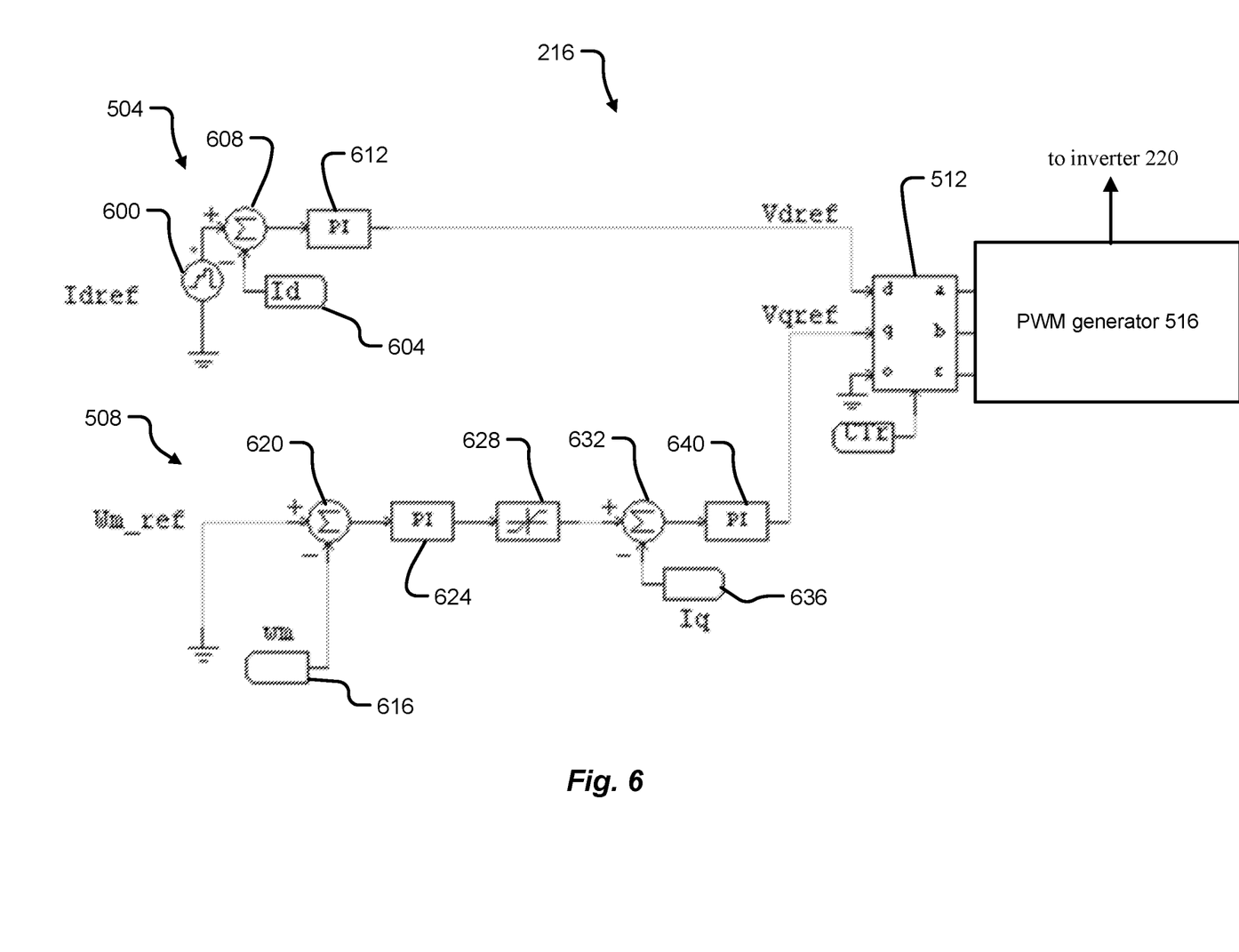
FIG. 6 illustrates an example schematic for a controller in accordance with at least one example embodiment.
Figure 7:
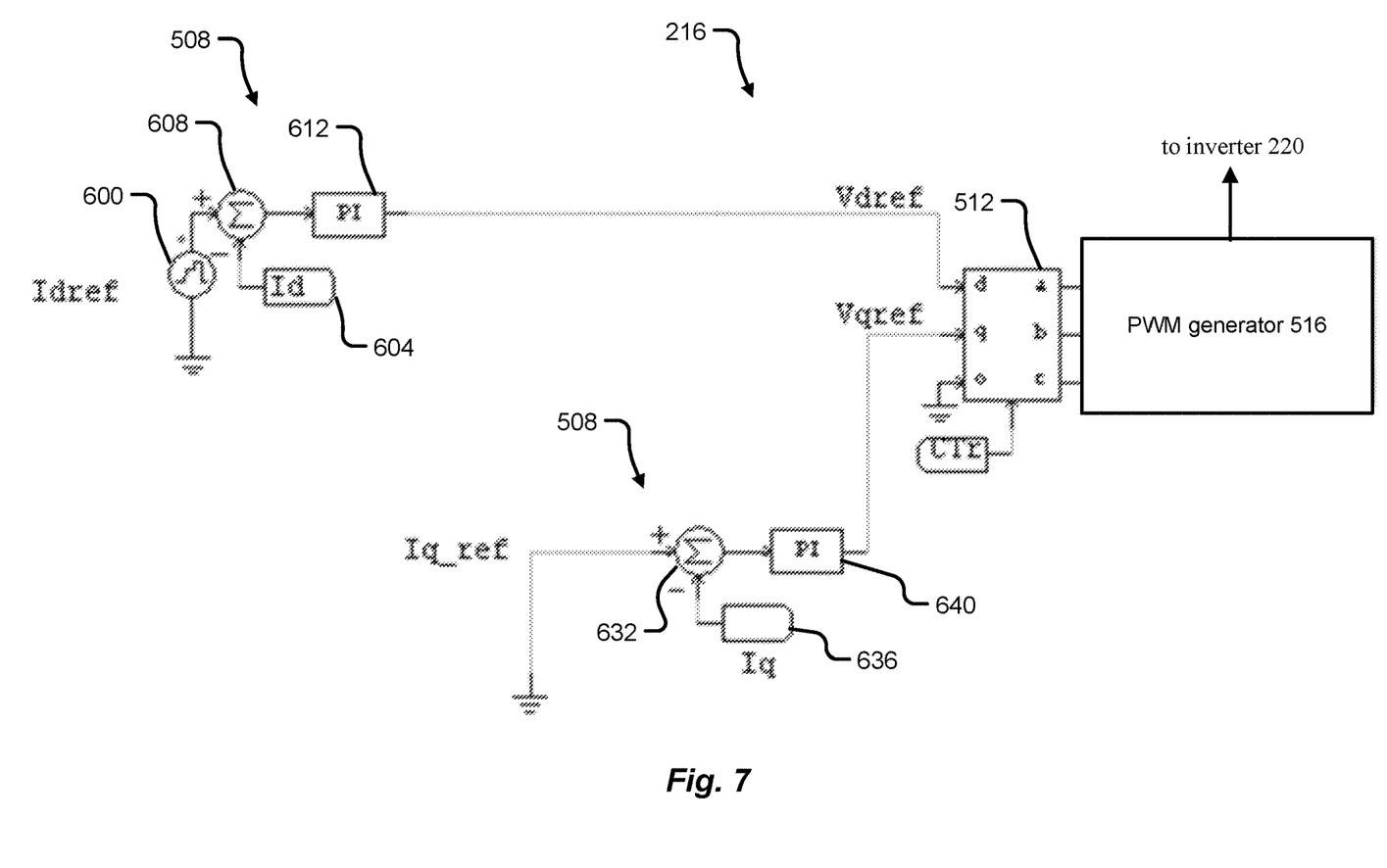
FIG. 7 illustrates an example schematic for a controller in accordance with at least one example embodiment.
Figures 8A, 8B:
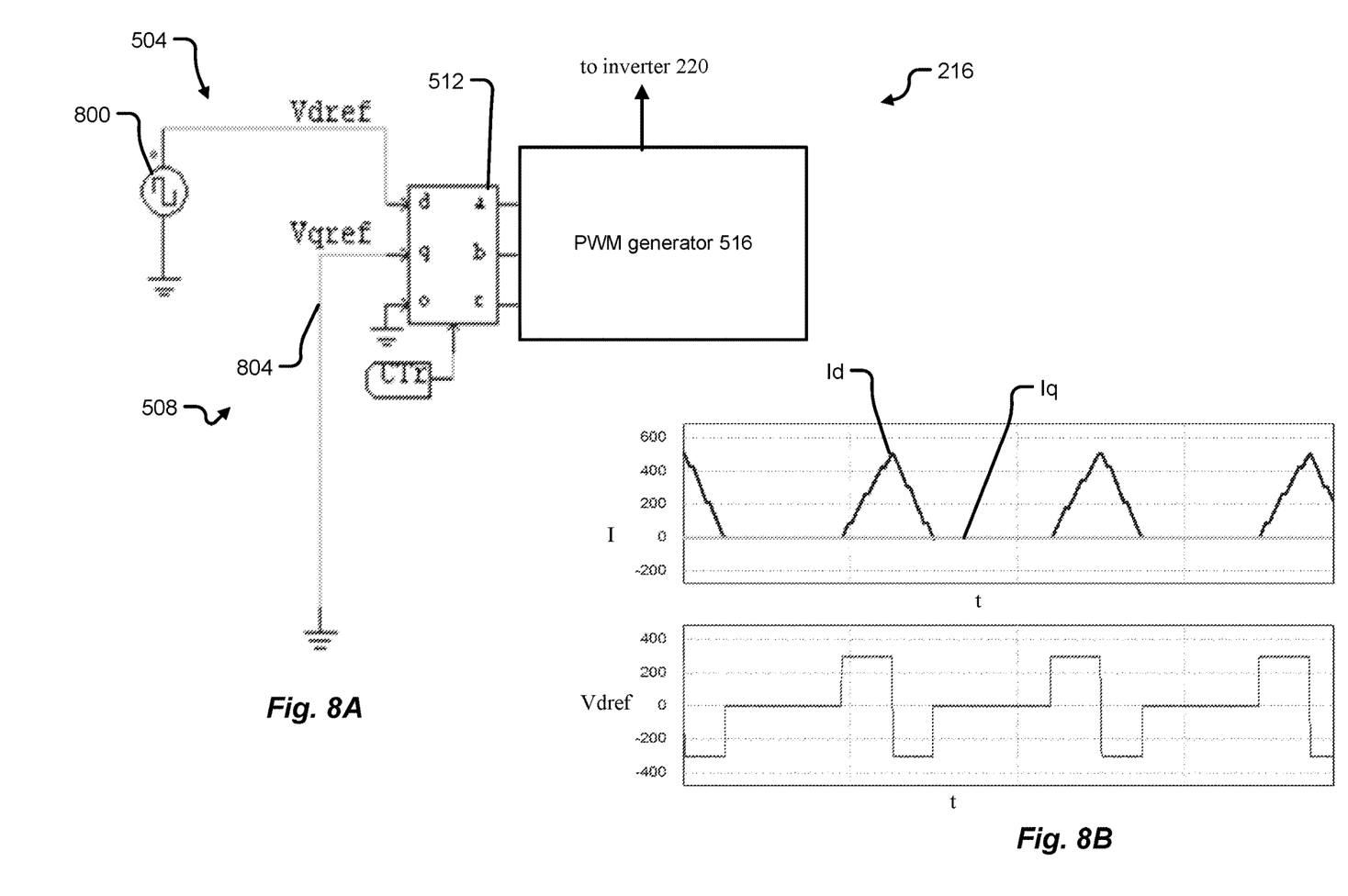
FIG. 8A illustrates an example schematic for a controller in accordance with at least one example embodiment.
FIG. 8B illustrates an example graph for a d-axis current and a q-axis current and an example graph for a d-axis reference voltage.

In operation, the controller 216 receives various inputs from elements of the system in FIG. 2 in order to determine/calculate the control signals output from the controller 216 the inverter 220. For example, the controller 216 may receive information related to measured d-axis and q-axis currents, information related to a position of the rotor 204, information related to motor speed or angular velocity, information related to sensed and/or desired temperature of the battery 208, information related to detected events current, information related to reference d and q-axis currents, and/or other information used for causing the battery 208 to self-heat. Thus, it should be appreciated that the system 200 provides various feedback signals to the controller 216 in order to facilitate gathering such information. FIGS. 6-8 provide additional details on the information that the controller 216 uses to generate the control signals for the inverter 220.

Figure 5B:
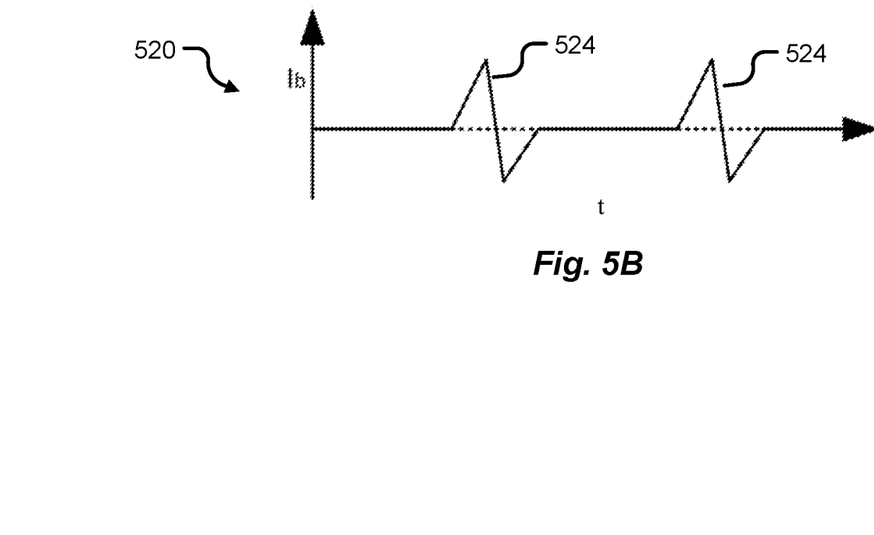
FIG. 5B is an example graph showing current pulses within a battery that cause the battery to self-heat in accordance with at least one example embodiment.

FIG. 5B shows a graph 520 illustrating a battery current Ib of the battery 208 with pulses 524 that heat the battery 208 to the desired temperature. Although two pulses are shown, it should be understood that more or fewer pulses may be used to heat the battery 208 to the desired temperature. The pulses 524 may have positive and negative amplitudes, and peaks of the positive and negative amplitudes may be identical. The pulses 524 within the battery 208 are caused by application of signals from the inverter 220 to the motor 204. Said another way, the control circuitry 212 provides one or more first current pulses (i.e., control signals) to the motor 204 (via the controller 216 and the inverter 220) using power from the battery 208 to cause one or more second current pulses 524 in the battery 208 that heat the battery 208 to a desired temperature while maintaining zero torque (or alternatively, substantially zero torque) in the motor 204.

FIG. 6 illustrates an example schematic for a controller 216 in accordance with at least one example embodiment. FIG. 6 illustrates an example embodiment of the first regulator circuit 504 and the second regulator circuit 508.

As shown in FIG. 6, the first regulator circuit 504 may include a reference current source 600 that produces a reference current Idref for a d-axis of the motor 204. The reference current Idref may be a design parameter that is based on empirical evidence and/or preference. For example, the reference current Idref may be selected based on an amplitude and/or duration desired for one of the pulses 524 in the battery 208.

The first regulator circuit 504 may further include a measurement device 604 to measure a d-axis current Id. The d-axis current Id may be real-time or near real-time measurement of the d-axis current of the motor 204, which may be measured by converting a, b, and c axis currents of the motor 204 into d and q-axis currents. Such conversion may be carried out by the converter 512 doing a conversion in reverse to that shown in FIG. 6 or by another converter 512 capable of converting a, b, c, axis currents into d and q-axis currents using the Park transformation.

The first regulator circuit 504 further includes a comparator 608 to compare the reference current Idref to the measured current Id and output a difference to a PI (proportional integral) regulator 612. The PI regulator 612 converts the difference into a voltage and outputs the voltage as a d-axis reference voltage Vdref to the converter 512. The first regulator circuit 504 may be said to use direct current regulation for the d-axis current. In addition, it may be said that the first regulator circuit 504 generates the first signal Vdref based on a reference d-axis current Idref and a measured d-axis current Id.

The second regulator circuit 508 may include a speed outer loop and a current inner loop. The speed outer loop may collect information related to a speed or angular velocity of the motor 204. Thus, the second regulator circuit 508 includes a reference speed Wm_ref and a measurement device to measure a speed of the motor wm. The reference speed Wm_ref may be a ground signal since the q-axis current should remain at zero, and the measured speed wm may be a real-time or near real-time measurement of the motor 204 speed. The measured speed wm and the reference speed Wm_ref are input to a comparator 620, which outputs the difference to a PI regulator 624. The output of the PI regulator 624 is input to an amplifier 628 (e.g., a linear amplifier), which amplifies the signal from the PI regulator 624 and provides the amplified signal to a comparator 632. The comparator 632 subtracts the amplified signal by the measured q-axis current Iq from a measurement device 636. Similar to the measurement device 604, the q-axis current Iq may be measured by converting a, b, and c axis currents with a converter using the Park transformation. Iq may be a real-time or near real-time measurement of the q-axis current of the motor 204.

The comparator 632 outputs a difference between the inputs from 628 and 636 to a PI regulator 640, which converts the received signal into a q-axis reference voltage Vqref.

In accordance with example embodiments described above, the converter 512 converts the signals Vdref and Vqref into a, b, and c axis signals used by the PWM generator 316 to generate control signals for the inverter 220 to control the a, b, and c coils of the motor 204. Here, it should be appreciated that the second regulator circuit 508 generates the second signal Vqref based on a reference motor speed Wm_ref, a measured motor speed wm, and a measured q-axis current Iq.

FIG. 7 illustrates an example schematic for the controller 216 in accordance with at least one example embodiment. FIG. 7 illustrates some of the same elements as FIG. 6, and thus, a description of these elements is not repeated. For example, the d-axis reference voltage (or first signal) is generated in the same manner as that described above for FIG. 6. FIG. 7 differs from FIG. 6 in that the speed outer loop has been removed in the second regulator circuit 508. Instead, the comparator 632 receives a q-axis reference current Iq_ref. In this example, Iq_ref is a ground signal because the q-axis current should be maintained at zero. The comparator determines a difference between the q-axis reference current Iq_ref with the measured q-axis current Iq, and the PI regulator 640 outputs the difference as the q-axis reference voltage Vqref. Thus, it may be said that the second regulator circuit 508 generates the second signal Vqref based on a reference q-axis current Iq_ref and a measured q-axis current Iq.

FIG. 8A illustrates an example schematic for the controller 216 in accordance with at least one example embodiment. FIG. 8A illustrates some of the same elements as FIG. 6, and thus, a description of these elements is not repeated. FIG. 8A differs from FIGS. 6 and 7 in that the first regulator circuit 504 includes a voltage generator 800 to generate the d-axis reference voltage Vdref, and that the second regulator circuit 508 generates or receives a ground signal 804 as the q-axis reference voltage Vqref.

FIG. 8B illustrates an example graph for a d-axis current and a q-axis current and an example graph for a d-axis reference voltage. The voltage generator 800 may generate the d-axis reference voltage Vdref as shown in FIG. 8B to cause the d-axis current Id (similar to FIG. 4) having the pulses also shown in FIG. 8B. According to at least one example embodiment, the positive and negative voltage pulses of Vdref have identical peak amplitudes. Here, it should be appreciated that Vdref may be varied according to design preferences and/or empirical evidence. In FIG. 8B, the q-axis current Iq remains at zero because the q-axis reference voltage Vqref is held at zero (or ground). As noted above, a pulsing d-axis current Id as shown in FIG. 8B causes corresponding current pulses in the battery 208 to self-heat the battery 208 (see FIG. 5B).

Figure 9:
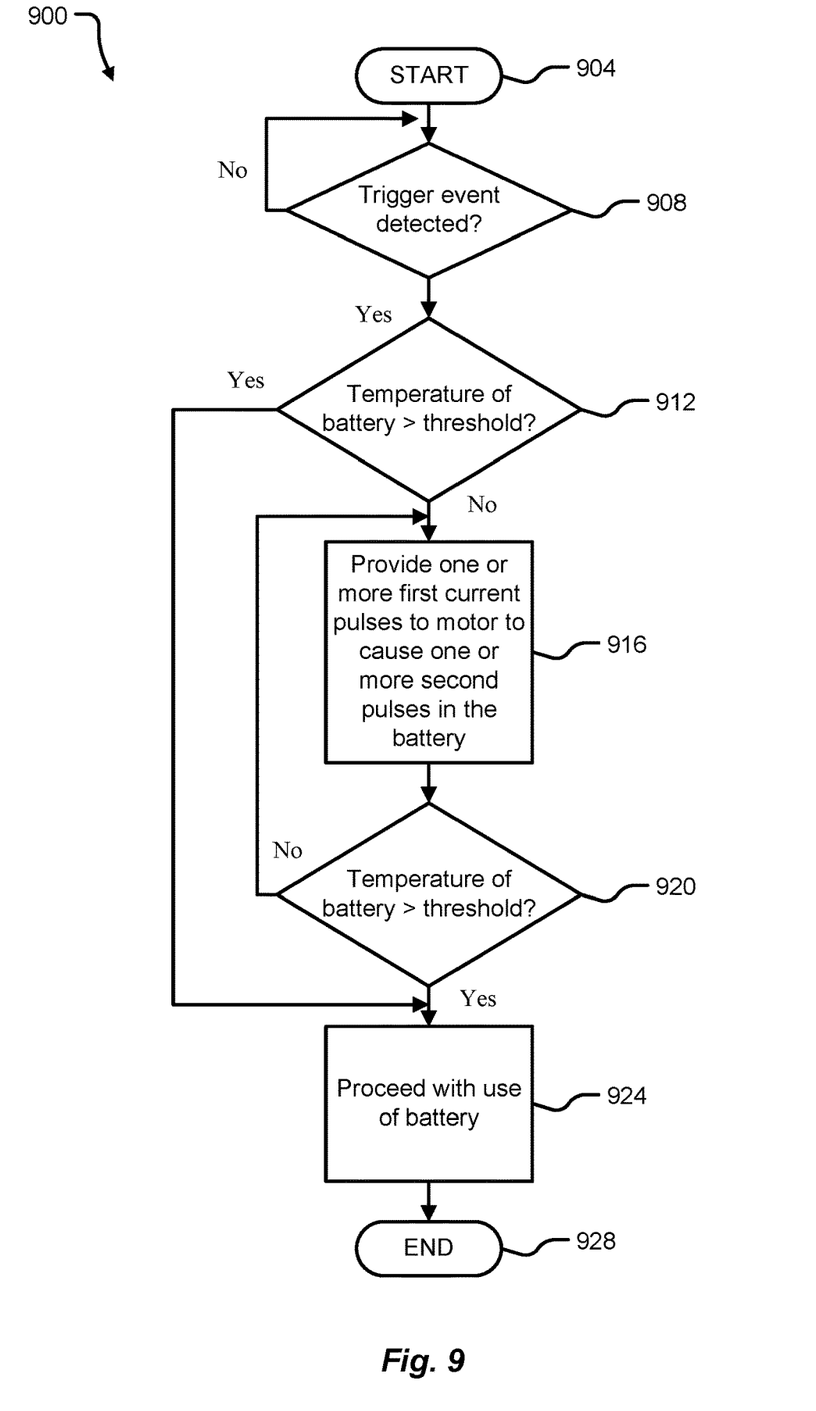
FIG. 9 illustrates a method according to at least one example embodiment.

FIG. 9 illustrates a method 900 according to at least one example embodiment. In more detail, FIG. 9 illustrates a method for operating the system 200 of FIG. 2.

While a general order for the steps of the method 900 is shown in FIG. 9, the method 900 can include more or fewer steps or can arrange the order of the steps differently than those shown in FIG. 9. Generally, the method 900 starts at operation 904 and ends at operation 928. The method 900 can be executed as a set of computer-executable instructions encoded or stored on a computer readable medium and executed by the controller 216. Additionally or alternatively, the operations discussed with respect to FIG. 9 may be implemented by various elements of the system(s) FIGS. 1-8. Hereinafter, the method 900 shall be explained with reference to the systems, components, assemblies, devices, user interfaces, environments, software, etc. described in conjunction with FIGS. 1-8.

In operation 908, the method 900 includes determining whether a triggering event has been detected. For example, the controller 216 uses information provided by the event detector 232 to detect whether a charging operation of the battery 208 is about to occur, or whether some other event has occurred or is anticipated to occur that requires the battery 208 to be at a certain temperature before undergoing charging and/or discharging. If not, the method 900 continues to check for a triggering event. If so, the method 900 proceeds to operation 912.

In operation 912, the method 900 determines whether a temperature of the battery 208 is greater than a temperature threshold. The temperature of the battery 208 may be measured in one or more of the manners discussed above, and the temperature threshold may be set according to design parameters. For example, the temperature threshold is a temperature at which the battery 208 is known to safely charge and/or discharge. If the temperature of the battery 208 is greater than the threshold, then the method 900 proceeds to operation 924 to proceed with use of the battery 208, which may include charging and/or discharging operations for the battery 208. If the temperature of the battery 208 is not greater than the threshold, then the method proceeds to operation 916.

In operation 916, the method 900 undertakes operations to self-heat the battery 208 in accordance with at least one example embodiment described above with reference to FIGS. 1-8. For example, the control circuitry 212 provides one or more first current pulses to the motor 204 to cause one or more second current pulses (Ib) in the battery 208 to heat the battery 208.

In operation 920, the method 900 determines whether the temperature of the battery 208 is greater than the threshold. If not, the method 900 returns to operation 916 to continue to heat the battery 208 to the threshold temperature. If so, the method 900 proceeds to operation 924 to proceed with use of the battery 208 for charging and/or discharging operations.

Although example embodiments have been discussed with reference to example voltage/current regulation, it should be understood that example embodiments are not limited thereto. It should be appreciated that example embodiments provide convenient and efficient methods for self-heating a battery to improve battery life and/or avoid battery damage as a result of attempting to charge and discharge the battery at low temperatures, whereas related art systems utilize indirect heating of the battery using coolant that is heated by a heater.

At least one embodiment is directed to a system, comprising a motor, a battery that provides power to the motor, and control circuitry that provides one or more first current pulses to the motor using power from the battery to cause one or more second current pulses in the battery that heat the battery to a desired temperature while maintaining zero torque (or alternatively, substantially zero torque) in the motor.

According to at least one aspect of the present disclosure, the control circuitry includes a controller, and an inverter coupled to the controller and between the battery and the motor. The controller applies control signals to the inverter to cause the inverter to provide the one or more first current pulses to the motor.

According to at least one aspect of the present disclosure, the controller includes a pulse generator that generates each control signal based on a first signal for a d-axis of the motor and a second signal for a q-axis of the motor, and the pulse generator provides the control signals to the inverter for each phase of the motor.

According to at least one aspect of the present disclosure, the controller includes a first regulator circuit that generates the first signal, and a second regulator circuit that generates the second signal.

According to at least one aspect of the present disclosure, the first regulator circuit includes a voltage generator that generates the first signal as a voltage signal with positive and negative voltage pulses, and the second regulator circuit generates a ground signal.

According to at least one aspect of the present disclosure, the positive and negative voltage pulses have identical peak amplitudes.

According to at least one aspect of the present disclosure, the first regulator circuit generates the first signal based on a reference d-axis current and a measured d-axis current.

According to at least one aspect of the present disclosure, the second regulator circuit generates the second signal based on a reference motor speed, a measured motor speed, and a measured q-axis current.

According to at least one aspect of the present disclosure, the second regulator circuit generates the second signal based on a reference q-axis current and a measured q-axis current.

According to at least one aspect of the present disclosure, the first regulated signal and the second regulated signal are voltage signals.

According to at least one aspect of the present disclosure, the system includes a position sensor that senses a position of a rotor of the motor, and the controller generates the control signals based on the sensed position of the rotor.

According to at least one aspect of the present disclosure, the system includes a first temperature sensor that senses temperature of the battery, and the control circuitry determines to provide the one or more first pulses when the sensed temperature of the battery is below a threshold temperature.

According to at least one aspect of the present disclosure, the control circuitry provides the one or more first pulses when the sensed temperature of the battery is below the threshold temperature and in response to a trigger.

At least one example embodiment is directed to a vehicle, comprising a motor, a battery that provides power to the motor, and control circuitry that provides one or more first current pulses to the motor using power from the battery to cause one or more second current pulses in the battery that heat the battery to a desired temperature while maintaining zero torque (or alternatively, substantially zero torque) in the motor.

According to at least one aspect of the present disclosure, the control circuitry includes a controller, and an inverter coupled to the controller, the motor, and the battery. The controller includes a pulse generator that generates control signals based on a first signal for a d-axis of the motor and a second signal for a q-axis of the motor, and the pulse generator provides the control signals to the inverter for each phase of the motor.

According to at least one aspect of the present disclosure, the control circuitry includes a first regulator circuit that generates the first signal, and a second regulator circuit that generates the second signal.

According to at least one aspect of the present disclosure, the first regulator circuit includes a voltage generator that generates the first signal as a voltage signal with positive and negative voltage pulses, and the second regulator circuit generates a ground signal.

At least one example embodiment is directed to a method, comprising applying one or more first current pulses to a motor using power from a battery to cause one or more second current pulses in the battery that heat the battery to a desired temperature while maintaining zero torque (or alternatively, substantially zero torque) in the motor.

According to at least one aspect of the present disclosure, the method includes generating control signals based on a first signal for a d-axis of the motor and a second signal for a q-axis of the motor, and providing the control signals to an inverter to cause the inverter to apply the one or more first current pulses to the motor.

According to at least one aspect of the present disclosure, the first and second signals are voltage signals.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A system, comprising:
   a motor;
   a battery that provides power to the motor;
   control circuitry that provides one or more first current pulses to the motor using power from the battery to cause the battery to self-heat to a desired temperature while maintaining substantially zero torque in the motor, wherein the control circuitry includes a controller and an inverter coupled to the controller, the battery, and the motor, and wherein the controller applies control signals to the inverter which causes the one or more first current pulses to be provided to the motor; and
   a position sensor that senses a position of a rotor of the motor, wherein the controller generates the control signals based on the sensed position of the rotor.

2. The system of claim 1, wherein the controller includes a pulse generator that generates each control signal based on a first signal for a d-axis of the motor and a second signal for a q-axis of the motor, and wherein the pulse generator provides the control signals to the inverter for each phase of the motor.

3. The system of claim 2, wherein the controller includes a first regulator circuit that generates the first signal, and a second regulator circuit that generates the second signal.

4. The system of claim 2, wherein the first signal and the second signal are voltage signals.

5. The system of claim 3, wherein the first regulator circuit includes a voltage generator that generates the first signal as a voltage signal with positive and negative voltage pulses, and the second regulator circuit generates a ground signal.

6. The system of claim 5, wherein the positive and negative voltage pulses have identical peak amplitudes.

7. The system of claim 3, wherein the first regulator circuit generates the first signal based on a reference d-axis current and a measured d-axis current.

8. The system of claim 7, wherein the second regulator circuit generates the second signal based on a reference motor speed, a measured motor speed, and a measured q-axis current.

9. The system of claim 7, wherein the second regulator circuit generates the second signal based on a reference q-axis current and a measured q-axis current.

10. The system of claim 1, further comprising:
a first temperature sensor that senses temperature of the battery, wherein the control circuitry determines to provide the one or more first current pulses when the sensed temperature of the battery is below a threshold temperature.

11. The system of claim 10, wherein the control circuitry provides the one or more first current pulses when the sensed temperature of the battery is below the threshold temperature and in response to a trigger.

12. A vehicle, comprising:
a motor;
a battery that provides power to the motor;
control circuitry that provides one or more first current pulses to the motor using power from the battery to cause the battery to self-heat to a desired temperature while maintaining substantially zero torque in the motor, wherein the control circuitry includes a controller, and an inverter coupled to the controller, the battery, and the motor, and wherein the controller applies control signals to the inverter which causes the one or more first current pulses to be provided to the motor; and
a position sensor that senses a position of a rotor of the motor, wherein the controller generates the control signals based on the sensed position of the rotor.

13. The vehicle of claim 12, wherein the controller includes a pulse generator that generates the control signals based on a first signal for a d-axis of the motor and a second signal for a q-axis of the motor, and wherein the pulse generator provides the control signals to the inverter for each phase of the motor.

14. The vehicle of claim 13, wherein the control circuitry includes a first regulator circuit that generates the first signal, and a second regulator circuit that generates the second signal.

15. The vehicle of claim 14, wherein the first regulator circuit includes a voltage generator that generates the first signal as a voltage signal with positive and negative voltage pulses, and the second regulator circuit generates a ground signal.

16. A method, comprising:
generating control signals based on a sensed position of a rotor of a motor; and
providing the control signals to an inverter to cause one or more first current pulses to be provided to the motor using power from a battery to cause the battery to self-heat to a desired temperature while maintaining substantially zero torque in the motor.

17. The method of claim 16, wherein the control signals are generated further based on a first signal for a d-axis of the motor and a second signal for a q-axis of the motor.

18. The method of claim 17, wherein the first and second signals are voltage signals.

* * * * *